United States Patent
Baker

(10) Patent No.: US 11,247,283 B2
(45) Date of Patent: *Feb. 15, 2022

(54) ELECTROCHEMICAL MACHINING APPARATUS AND ELECTROCHEMICAL MACHINING METHOD THEREOF

(71) Applicant: INTAI TECHNOLOGY CORP., Taichung (TW)

(72) Inventor: George Edward Baker, Cleckheaton (GB)

(73) Assignee: INTAI TECHNOLOGY CORP., Taichung (TW)

(*) Notice: Subject to any disclaimer, the term of this patent is extended or adjusted under 35 U.S.C. 154(b) by 299 days.

This patent is subject to a terminal disclaimer.

(21) Appl. No.: 16/327,849

(22) PCT Filed: Aug. 25, 2016

(86) PCT No.: PCT/CN2016/096674
§ 371 (c)(1),
(2) Date: Feb. 24, 2019

(87) PCT Pub. No.: WO2018/035800
PCT Pub. Date: Mar. 1, 2018

(65) Prior Publication Data
US 2019/0193178 A1    Jun. 27, 2019

(51) Int. Cl.
*B23H 7/26* (2006.01)
*B23H 7/30* (2006.01)
(Continued)

(52) U.S. Cl.
CPC ............. *B23H 7/26* (2013.01); *B23H 3/00* (2013.01); *B23H 7/30* (2013.01); *C25F 7/00* (2013.01); *B23H 2400/00* (2013.01)

(58) Field of Classification Search
CPC ...................................................... B23H 3/04
See application file for complete search history.

(56) References Cited

U.S. PATENT DOCUMENTS 3,399,125 A * 8/1968 Mikoshiba ............... B23H 3/10
                                                           205/653
5,820,744 A * 10/1998 Edwards ................. B23H 3/02
                                                          205/640
(Continued)

FOREIGN PATENT DOCUMENTS

JP           11170119 A  *  6/1999

OTHER PUBLICATIONS

Machine translation of JP11-170119A. (Year: 1999).*

*Primary Examiner* — Brian W Cohen
(74) *Attorney, Agent, or Firm* — CKC & Partners Co., LLC

(57) ABSTRACT

An electrochemical machining apparatus being capable of performing multiple points and multiple angles machining is provided. The electrochemical machining apparatus includes at least one electrode member, a guiding member and an actuation member. The electrode member includes a conductive end and a free end, wherein the electrode member is rigid and unbendable. The guiding member is for limiting and guiding the electrode member to move. The actuation member is for exerting a force to the free end of the electrode member, thereby enabling the conductive end of the electrode member to form angle variations. A force-exerting direction from the actuation member to the free end is parallel to a central axis of the electrode member or deflects off the central axis so as to form the angle variations.

10 Claims, 19 Drawing Sheets

(51) Int. Cl.
*B23H 3/00* (2006.01)
*C25F 7/00* (2006.01)

(56) References Cited

U.S. PATENT DOCUMENTS

| | | | |
|---|---|---|---|
| 6,835,299 B1 * | 12/2004 | Tchugunov | B23H 3/00 |
| | | | 204/222 |
| 7,867,374 B2 | 1/2011 | Zdeblick et al. | |
| 8,535,491 B2 | 9/2013 | Wei et al. | |
| 9,403,227 B2 | 8/2016 | Tamura et al. | |
| 2011/0070096 A1 * | 3/2011 | Wei | B23H 9/14 |
| | | | 416/97 R |
| 2013/0193000 A1 * | 8/2013 | Platz | C25F 7/00 |
| | | | 205/653 |

\* cited by examiner

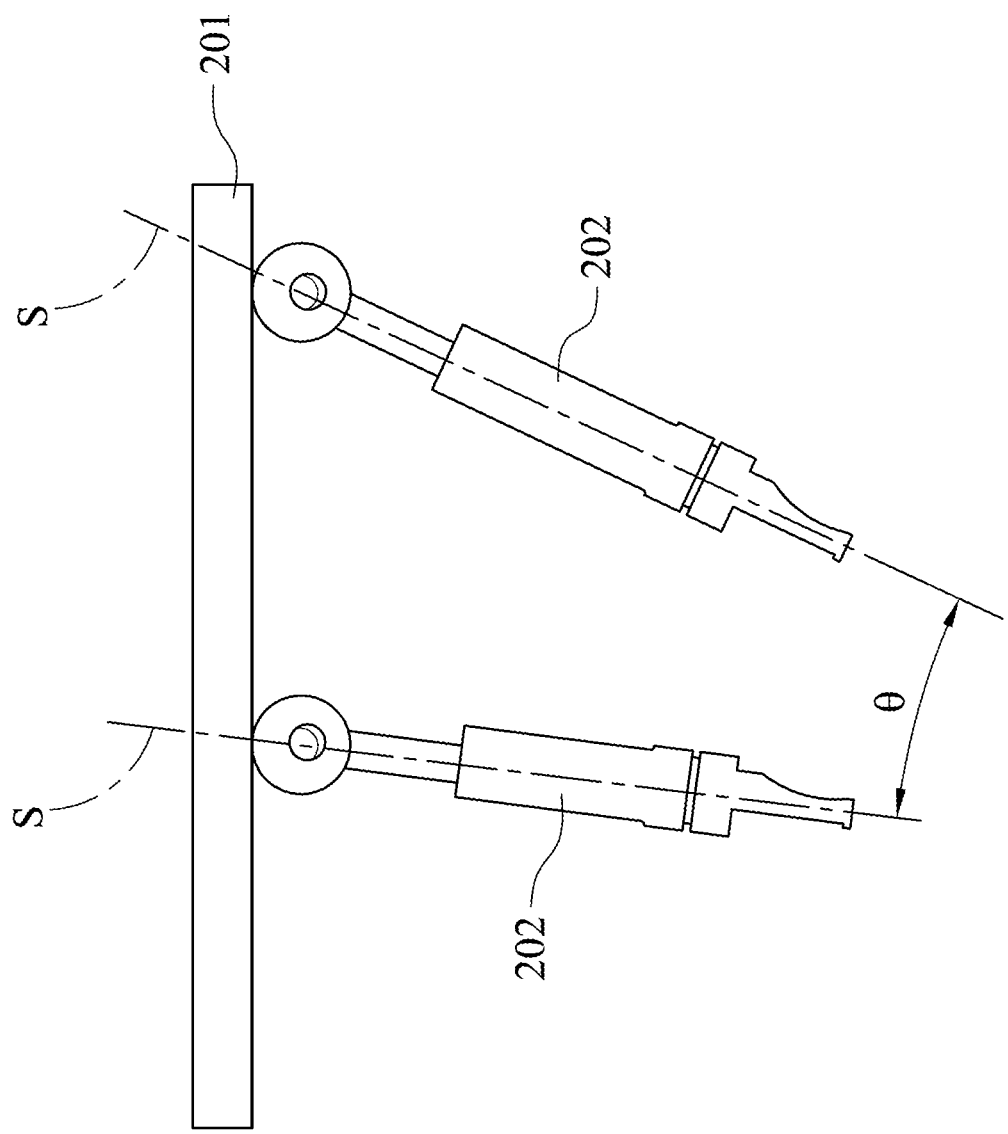

ELECTROCHEMICAL MACHINING APPARATUS AND ELECTROCHEMICAL MACHINING METHOD THEREOF

RELATED APPLICATIONS

This application is a continuation of International application No. PCT/CN2016/096674, filed Aug. 25, 2016, the content of which is herein incorporated by reference.

BACKGROUND

Technical Field

The present disclosure relates to an electrochemical machining apparatus and an electrochemical machining method. More particularly, the present disclosure relates to an electrochemical machining apparatus and an electrochemical machining method that utilizing electrodes having free ends, thereby achieving multiple points and multiple angles machining.

Description of Related Art

Recently, demands for high precision on large area machining technology has Increased rapidly. For example, the electronic industry, the optical engineering, the biotechnology, the aeronautic industry and the automotive industry are all equipped with high precision components.

Conventional mechanical machining tools such as lathe or milling machine are used to remove useless parts from an object so as to form desired shapes by physical methods. However, due to the conventional mechanical machining tools can only provide single point machining at a time and the limitation of the operation thereof, and the shapes cannot be formed with smooth edges and complex curvature; and the object usually be broken by the heat generated from abrasions. Furthermore, the objects to be machined are very hard, so that long time machining is needed, and it cannot to form the shapes in micro-meter scale or nano-meter scale.

According to the foregoing statement, the machining technology capable of simultaneously performing precision and large-area machining has also been developed vigorously. Electrochemical (ECM) is a technology that can perform high precision and large area machining, which is shown in FIG. 1. In FIG. 1, the electrode 102 is moved toward the work piece 101, but without contacting with the work piece 101. At the time, the electrode 102 acts as a Cathode, and the work piece 101 as an Anode. Electrolyte 103 fills between the work piece 101 and the electrode 102. When applying a voltage, the current passes through the Electrolyte 103 from the electrode 102 and into the work piece 101. Owing to the electrochemical action, material is removed from the work piece 101 as a metal hydroxide. This is flushed away in the electrolyte 103. The electrode 102 can be moved along a predetermined path, and electrochemical action continuously occurs on the surface of the work piece 101. Finally, unwanted material of the work piece 101 is removed, and the desired shape is formed on the work piece 101.

The advantages of the aforementioned electrochemical machining are: (a) It is suitable for machining very hard metal materials; (b) The electrode does not wear; (c) The process operates at relatively low temperature and there is no damage to the work piece 101 surface; and (d) Suitable for generating complex shapes in the work piece 101.

The aforementioned ECM technology provides more benefits than the conventional physical machining technology; however, it is also difficult to process the product having complex shapes due to the limitation of the electrode alignment. For example, in the aero engine or the automotive industry complex shapes are required owing to the consideration of Aerodynamics and security. Therefore, the blades in an aircraft or a vehicle are commonly required complex shapes, multiple orientations and high precision. These features are complex to produce by the conventional ECM devices owing to the limitations on the electrodes thereof.

There is a requirement to be able to produce several features (airfoils) simultaneously in the same work piece. ECM can do this with the appropriate tooling.

SUMMARY

According to one aspect of the present disclosure, an electrochemical machining apparatus being capable of performing multiple points and multiple angles machining is provided. The electrochemical machining apparatus includes at least one electrode member, a guiding member and an actuation member. The electrode member includes a conductive end and a free end, wherein the electrode is rigid and unbendable. The guiding member is for limiting and guiding the electrode member to move. The actuation member is for exerting a force to the free end of the electrode member, thereby enabling the conductive end of the electrode member to form angle variations. A force-exerting direction from the actuation member to the free end is parallel to a central axis of the electrode member or deflects off the central axis so as to form the angle variations.

According to another aspect of the present disclosure, an electrochemical machining apparatus being capable of performing multiple points and multiple angles machining is provided. The electrochemical machining apparatus includes at least two electrode members, a guiding member, a pressure box and an actuation member. Each of the electrode members includes a conductive end and a free end, wherein there is a distance between the at least two electrode members, and each of the electrodes is rigid and unbendable. The guiding member is for limiting and guiding the at least two electrode members to move. The pressure box is for accommodating the guiding member, wherein the pressure box is configured to provide a flow to an electrolyte therein. The actuation member is for exerting a force to the free end of each of the electrode members, thereby enabling the conductive end of each of the electrode members to form angle variations. A force-exerting direction from the actuation member to each of the free ends is parallel to a central axis of each of the electrode members or deflects off the central axis so as to form the angle variations.

According to still another aspect of the present disclosure, an electrochemical machining method is provided, which is capable of performing multiple points and multiple angles machining. The electrochemical machining method includes as follow. A plurality of electrode members are provided. A conductive end and a free end on each of the electrode members are formed.

A guiding member is provided. The guiding member is accommodated in a pressure box. The plurality of electrode members are passed through the guiding member. Each of the conductive ends are guided by the guiding member to form different moving paths. A force is exerted to the free end of each of the electrode members, thereby enabling the conductive end of each of the electrode members to form angle variations in accordance with the moving paths. An electrochemical machining is performed by utilizing the conductive ends of the electrode members simultaneously, and an electrolyte is flowed to each of the electrode members by the pressure box.

BRIEF DESCRIPTION OF THE DRAWINGS

FIG. 5 is an example of an alignment of the electrode member;

DETAILED DESCRIPTION

Figure 1:
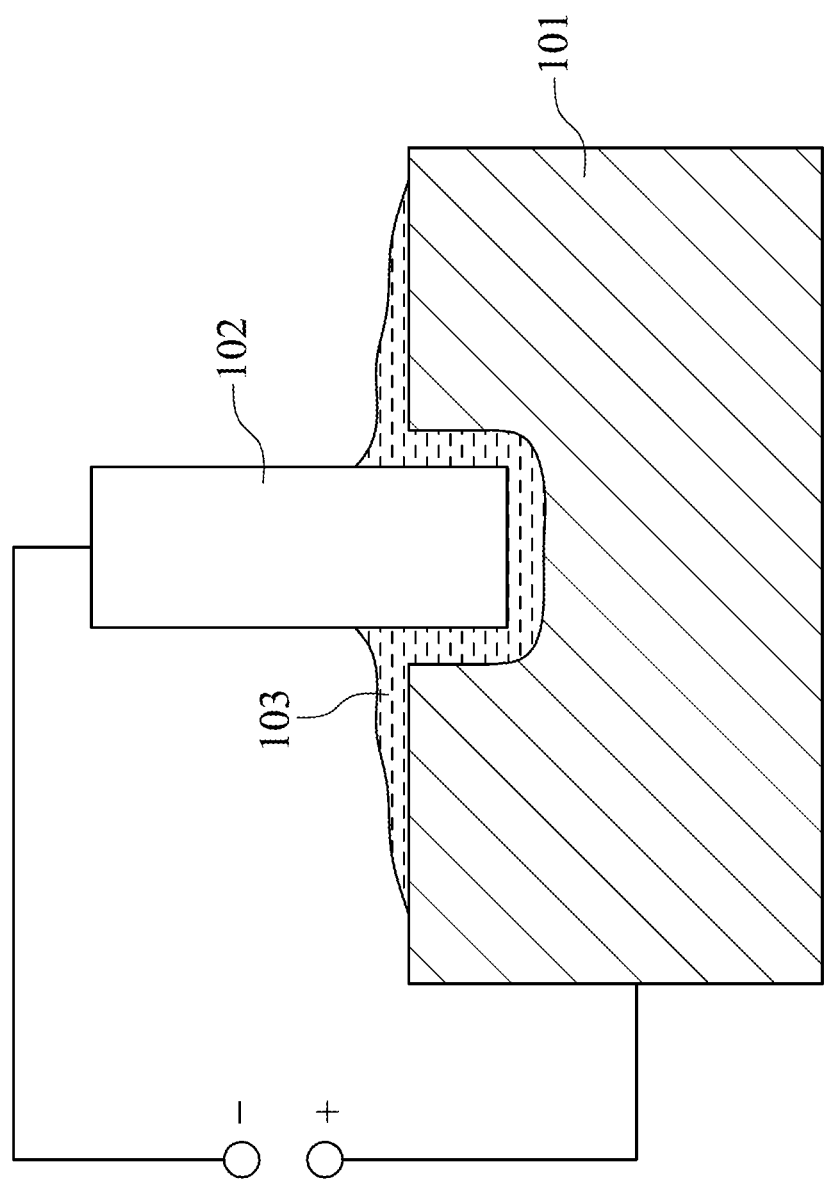
FIG. 1 is a schematic view showing a conventional electrochemical machining process.

Reference will now be made in detail to the present embodiments of the disclosure, examples of which are illustrated in the accompanying drawings. Wherever possible, the same reference numbers are used in the drawings and the description to refer to the same or like parts.

Figure 2:
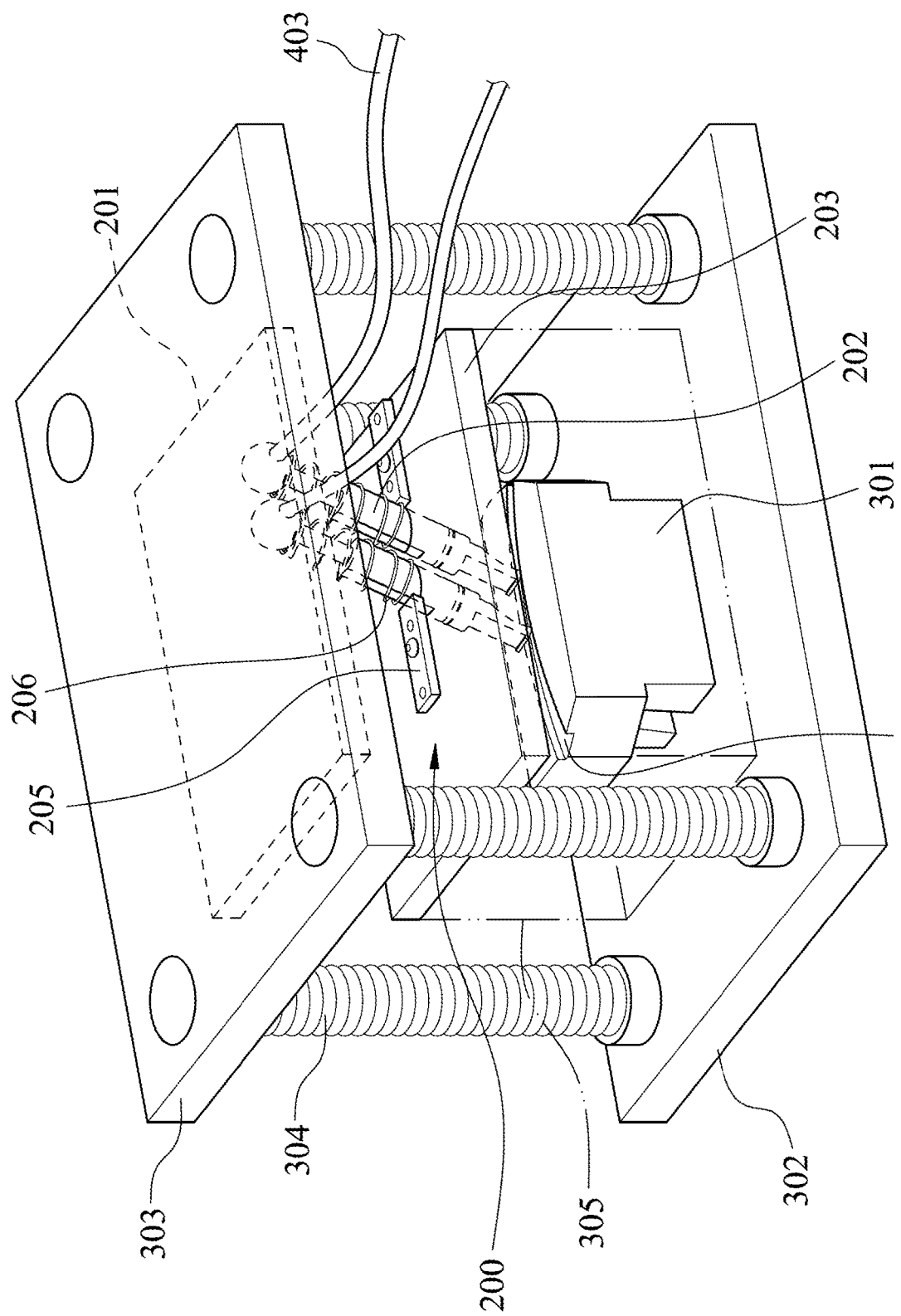
FIG. 2 is a schematic view showing an assembly of an electrochemical machining apparatus according to one embodiment of the present disclosure.
Figure 3:
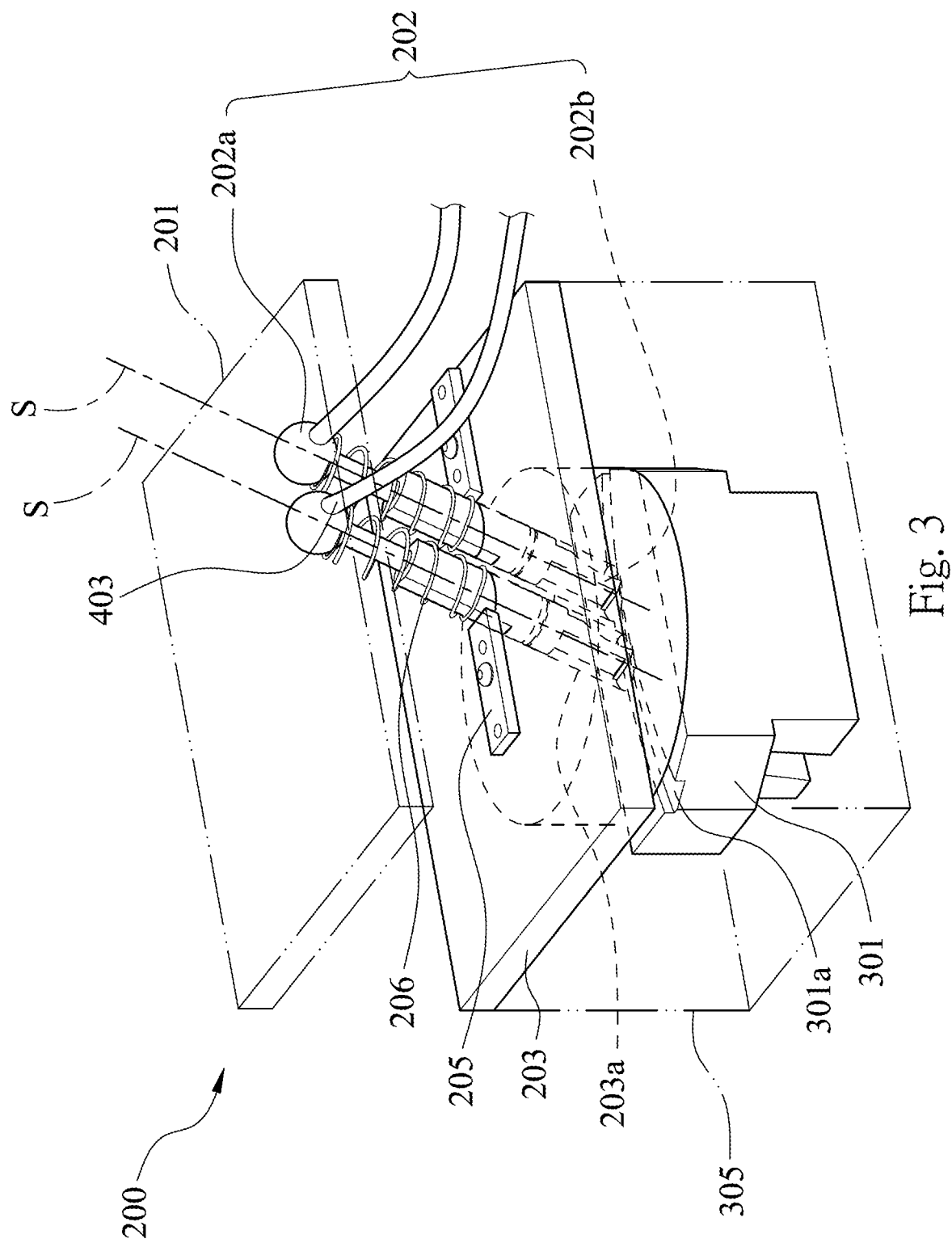
FIG. 3 is a schematic view showing a structure of the electrochemical machining apparatus of FIG. 2.
Figure 4:
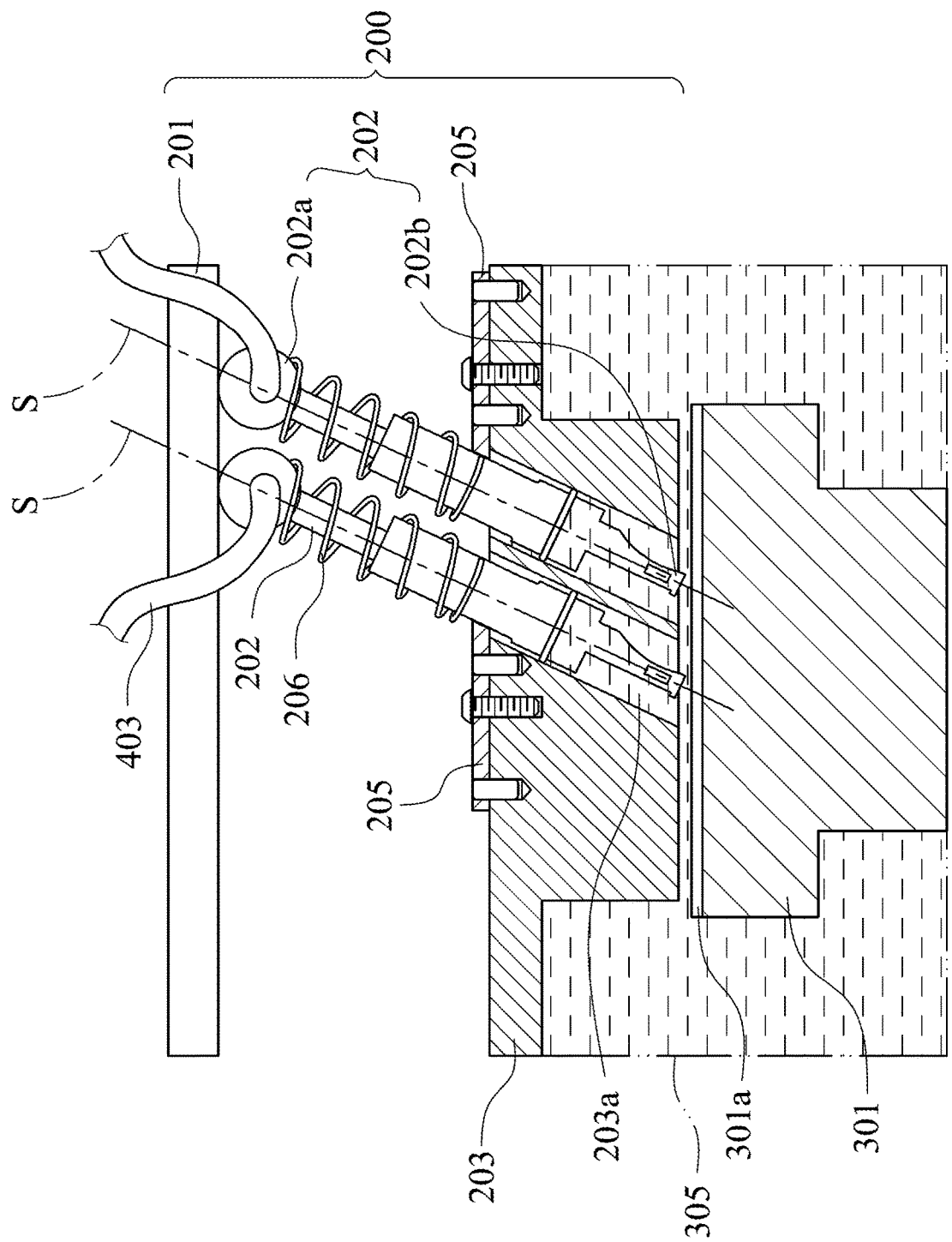
FIG. 4 is a cross-sectional view of the electrochemical machining apparatus of FIG. 3.

Please refer to FIG. 2, FIG. 3 and FIG. 4, FIG. 2 is a schematic view showing an assembly of an electrochemical machining apparatus 200 according to one embodiment of the present disclosure; FIG. 3 is a schematic view showing a structure of the electrochemical machining apparatus 200 of FIG. 2; and FIG. 4 is a cross-sectional view of the electrochemical machining apparatus 200 of FIG. 3.

The electrochemical machining apparatus 200 includes an actuation member 201, two electrode members 202, a guiding member 203 and a pressure box 305. In one example, the actuation member 201 is a plane plate for providing a uniform force. The electrochemical machining apparatus 200 can further include a stage 302 for disposing the aforementioned components thereon.

Each of the electrode members 202 has a conductive end 202b and a free end 202a. There is a distance between the two electrode members 202, and an angle θ is formed between the two electrode members 202. The angle θ can be freely changed for achieving more complex machining function, and it will be further mentioned in the embodiment hereafter.

Two guiding apertures 203a are formed on the guiding member 203, which are passed through by the two electrodes 202. Each of the guiding apertures 203a provides sufficient moving spaces to limit and guide the two electrode members 202. At the same time, the two electrode members 202 can form multiple angle variations in the guiding apertures 203a.

The pressure box 305 accommodates the guiding member 203, which provides a pressure to the electrolyte flowed between the electrode members 202 and the work piece 301.

For increasing the stability of the two electrode members 202, two fixing members 205 are disposed on two sides of each of the electrode members 202. In one example, the fixing members 205 abut two sidewalls of the two electrode members 202, thus self-rotation of the two electrode members 202 can be avoided.

Moreover, for achieving the functionality of repeat machining, two spring members 206 are disposed through by the two electrode members 202. Each of the spring members 206 is disposed between the guiding aperture 203a and the free end 202a of each of the electrode members 202, which is for providing an elastic recovering force to each of the electrode members 202, thus the two electrode members 202 can move back to its initial position.

The operation mechanism of the electrochemical machining apparatus 200 is then described in accordance with the aforementioned structure of the electrochemical machining apparatus 200. First, a work piece 301 is put into the pressure box 305. In order to generate electrochemical reaction by electrolyte, the pressure box 305 is filled with electrolyte, or the electrolyte can be filled between the electrode member 202 and the work piece 301. The electrode members 202 have a passage, and the passage is connected to an exit pipe 403 at the free end 202a of the electrode member 202. The pressure box 305 is sealed which has no other path for expelling the electrolyte. Thus, the electrolyte flows into the pressure box 305 with a pressure P1, passes through the passage in the electrode member 202, and then expels out through the exit pipe 403. At this time, a back pressure P2 is applied at the end of the exit pipe 403. That is, the forgoing disclosure is called reverse flow. In the conventional arts, the electrolyte flows into the work piece 301 in a single direction, there is no reverse flow as the present disclosure. The reverse flow of the present disclosure is favorable for ensuring that the electrolyte can flow on the surface of the work piece uniformly so as to enhance the machining precision.

Then, the electrolytic machining can be performed. A force plate 303 is used for exerting a downward force to the actuation member 201. The actuation member 201 pushes the two electrode members 202 so as to let the two electrode members 202 closer to the work piece 301, but without contacting the work piece 301, and a gap is formed therebetween. Further, the force plate 303 has waterproof guiding posts 304 located on four corners thereof. When power is applied to the two electrode members 202, an electrochemical machining effect commences on the work piece 301 to generate substance such as metal-hydroxide, therefore the material on the surface of the work piece 301 is removed so as to form a desired shape. The material removed from the surface of the work piece 301 can be collected in a return tank. The speed of the electrolytic machining is controlled by CNC.

The free ends 202a of the two electrode members 202 can be freely moved and are not contacted with the actuation member 201 initially. When the actuation member 201 is forced by the force plate 303, it will move gradually close to the free ends 202a and then contact with the free ends 202a. In one example, a surface of the free end 202a is arc-shaped. Therefore, when the actuation member 201 contacts with the free end 202a, it contacts a point on the surface of the free end 202a and exerts a force to the free end 202a. Owing to the arc-shaped surface of the free end 202a, different force-exerting directions of the exerted force may occur. For example, the force-exerting direction may be parallel to a central axis S of the electrode member 202 or deflects off the central axis S of the electrode member 202. Therefore, when the actuation member 201 vertically exerts the force to the electrode members 202, each of the electrode members 202 can form angle variations. In more detail, the electrode member 202 is rigid and unbendable, thus, when the free end 202a of the electrode member 202 is exerted with a force, the conductive end 202b of the electrode member 202 will be linked-up with the free end 202a. The conductive end 202b of the electrode member 202 passes through the guiding aperture 203a of the guiding member 203. The guiding member 203 can be disposed on a support plate 305. Through the limitation and guiding of the guiding member 203, the two electrode members 202 can be guided to move along a predetermined path. Therefore, the electrochemical reaction can be continuously formed on the surface of the work piece 301 so as to form a desired shape 301a. Moving paths of the two electrode members 202 can be changed depend on the real conditions, and the two electrode members 202 can have different moving paths, so as to achieve complex machining, which will be detail described hereafter.

In the operation procedure of the aforementioned electrochemical machining apparatus 200, when only one electrode member 202 is used, the arc-shaped surface of the free end 202a can be pushed to form multi angle variations. In a more complicated situation, when two or more electrode members 202 are used, the arrangement of each of the electrode members 202 can be varied.

Figure 6A:
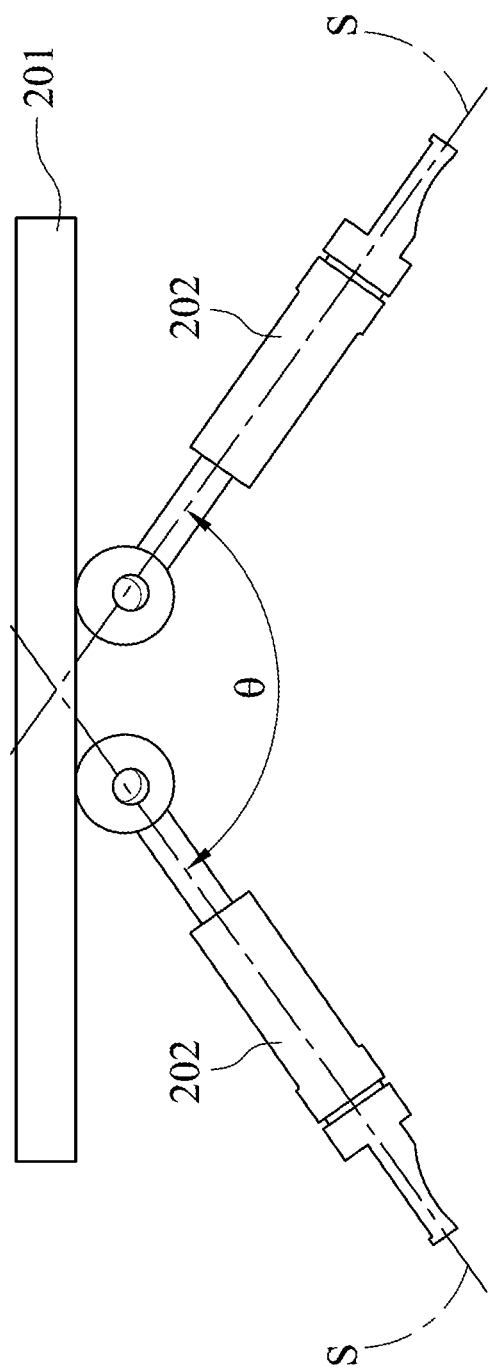
FIG. 6A is another example of the arrangement of the electrode member.
Figure 6B:
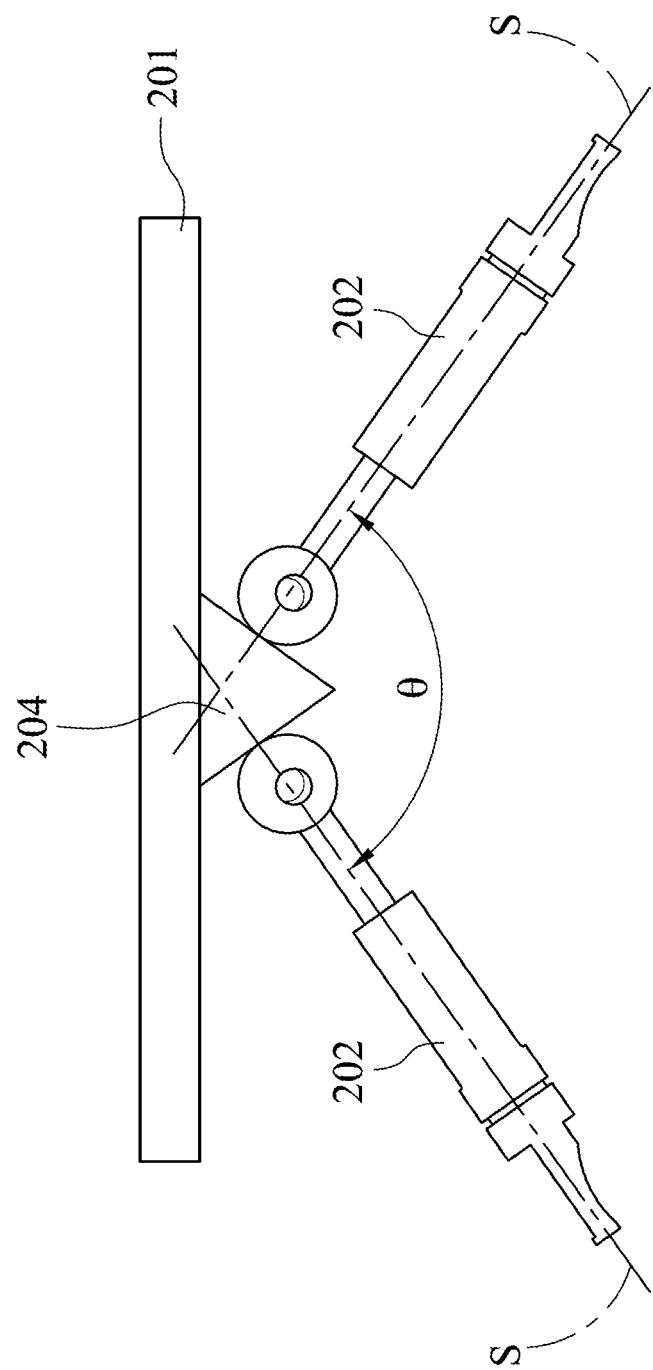
FIG. 6B is a schematic view showing an example of a blocking bar disposed between two electrode members of FIG. 6A.

Please refer to FIG. 5, FIG. 6A and FIG. 6B. FIG. 5 is an example of an arrangement of the electrode member 202. FIG. 6A is another example of the arrangement of the electrode member 202. FIG. 6B is a schematic view showing an example of a blocking bar disposed between two electrode members 202.

There is a distance between the two electrode members 202, and an angle θ is formed between the two electrode members 202. The angle θ is ranged from 0 degrees to 180 degrees. In FIG. 3, the angle θ is 0 degrees, thus the two electrode members 202 are aligned in parallel. In FIG. 5, the angle θ is greater than 0 degrees and smaller than 90 degrees; where in FIG. 6A, the angle θ is greater than 90 degrees and smaller than 180 degrees. According to the angle variations with the multi angle variations of the electrode members 202 it is possible to perform machining to a high complication curvature surface. In FIG. 6B, two blocking bars 204 can be disposed to the actuation member 201 for enabling the actuation member 201 to provide a uniform exerting force to each of the electrode members 202.

Furthermore, when the two electrode members 202 are aligned in parallel, the force-exerting direction which is from the actuation member 201 to each of the electrode members 202 can be parallel to the central axis S of each electrode member 202 or deflects off the central axis S of each electrode member 202. Therefore, the conductive end 202b of each of the electrode members 202 can have complicated angle variations. When the two electrode members 202 are not aligned in parallel, more complicated angle variations of the conductive end 202b can be possibly obtained. Thus, when two electrode members 202 are utilized to perform electrochemical machining simultaneously, multiple points and multiple angles machining can be performed to the surface of the work piece 301, thus very complicated curvature surface machining can be achieved, and machining efficiency can be increased. The aforementioned actuation member 201 can also be a driving apparatus. For example, the free end 202a of the electrode member can be connected to a linear guide rail, thus the electrode member 202 can be guided by the linear guide rail to form multi angle variations.

Figure 7:
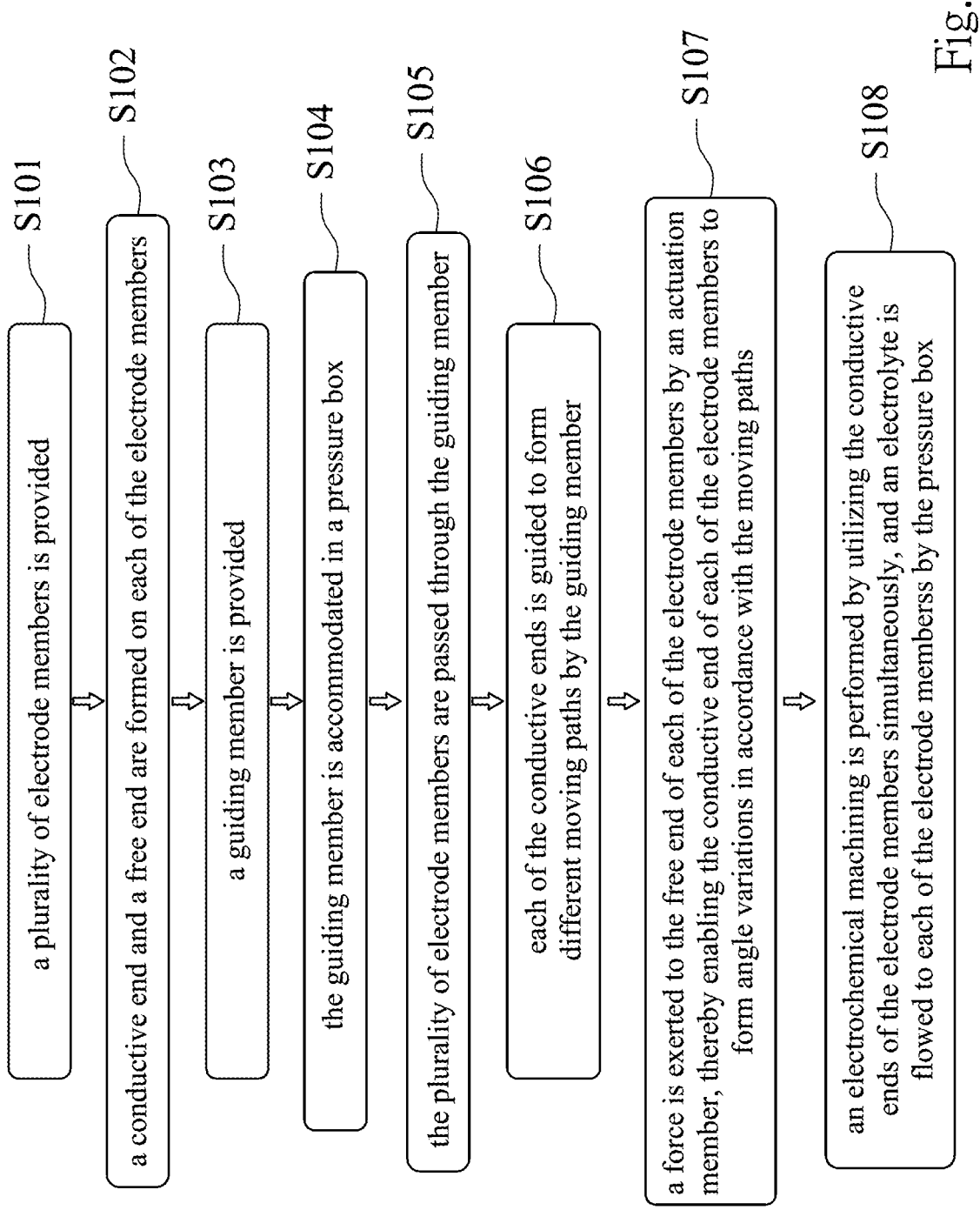
FIG. 7 is a flow chart showing an electrochemical machining method according to another embodiment of the present disclosure.

Please refer to FIG. 7, FIG. 7 is a flow chart showing an electrochemical machining method according to another embodiment of the present disclosure. In order to form complicated multiple points and multiple angles machining, the electrochemical machining method is provided, which includes the following steps. In the step S101, a plurality of electrode members is provided. In the step S102, a conductive end and a free end are formed on each of the electrode members. In the step S103, a guiding member is provided. In the step S104, the guiding member is accommodated in a pressure box. In the step S105, the plurality of electrode members are passed through the guiding member. In the step S106, each of the conductive ends is guided to form different moving paths by the guiding member. In the step S107, a force is exerted to the free end of each of the electrode members by an actuation member, thereby enabling the conductive end of each of the electrode members to form angle variations in accordance with the moving paths. In the step S108, an electrochemical machining is performed by utilizing the conductive ends of the electrode members simultaneously, and an electrolyte is flowed to each of the electrode members by the pressure box.

Figure 8A:
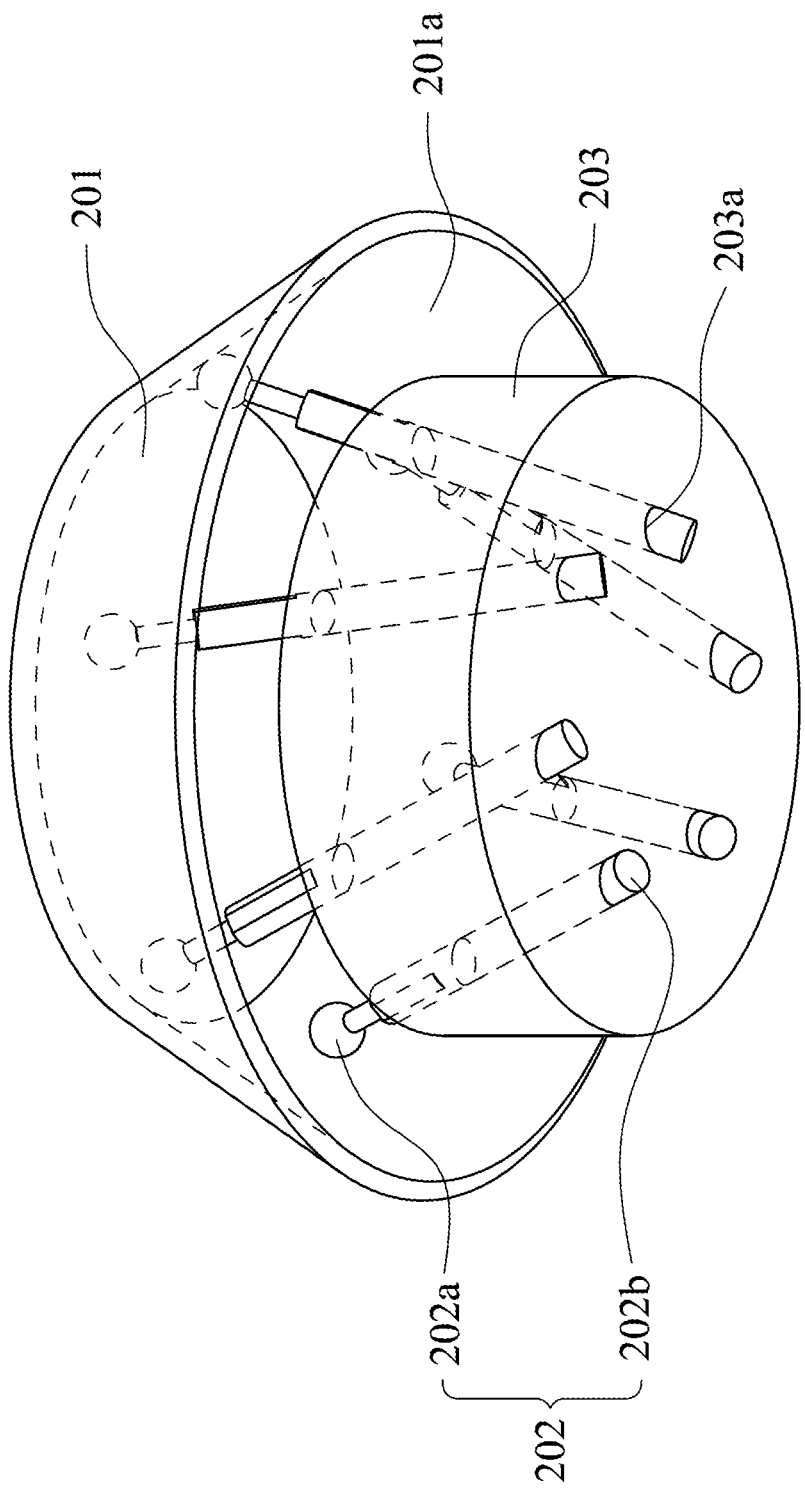
FIG. 8A is a schematic view showing a structure of an electrochemical machining apparatus which is capable of performing multiple points and multiple angles machining according to one embodiment of the present disclosure.
Figure 8B:
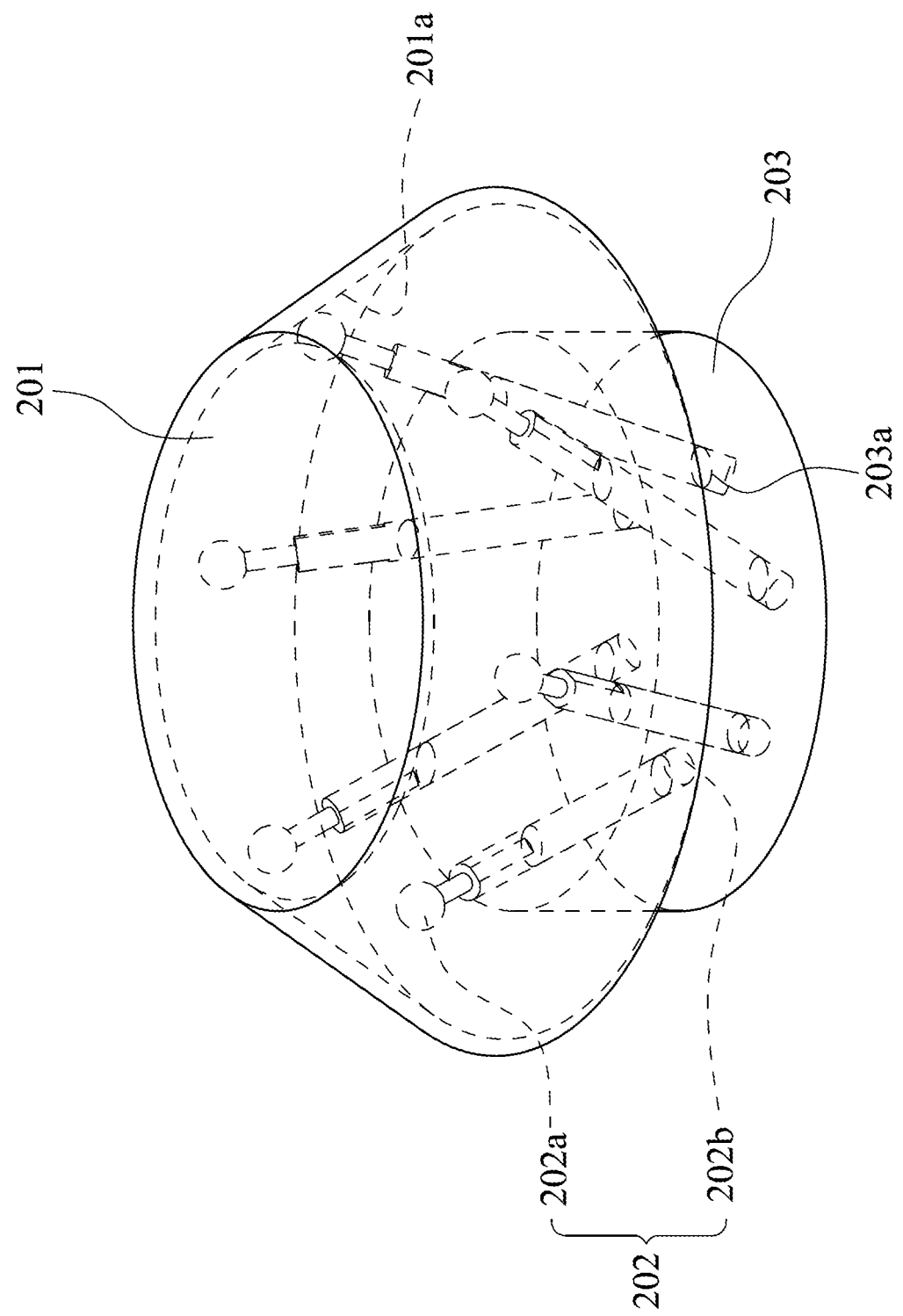
FIG. 8B is another schematic view showing the structure of the electrochemical machining apparatus of FIG. 8A.
Figure 8C:
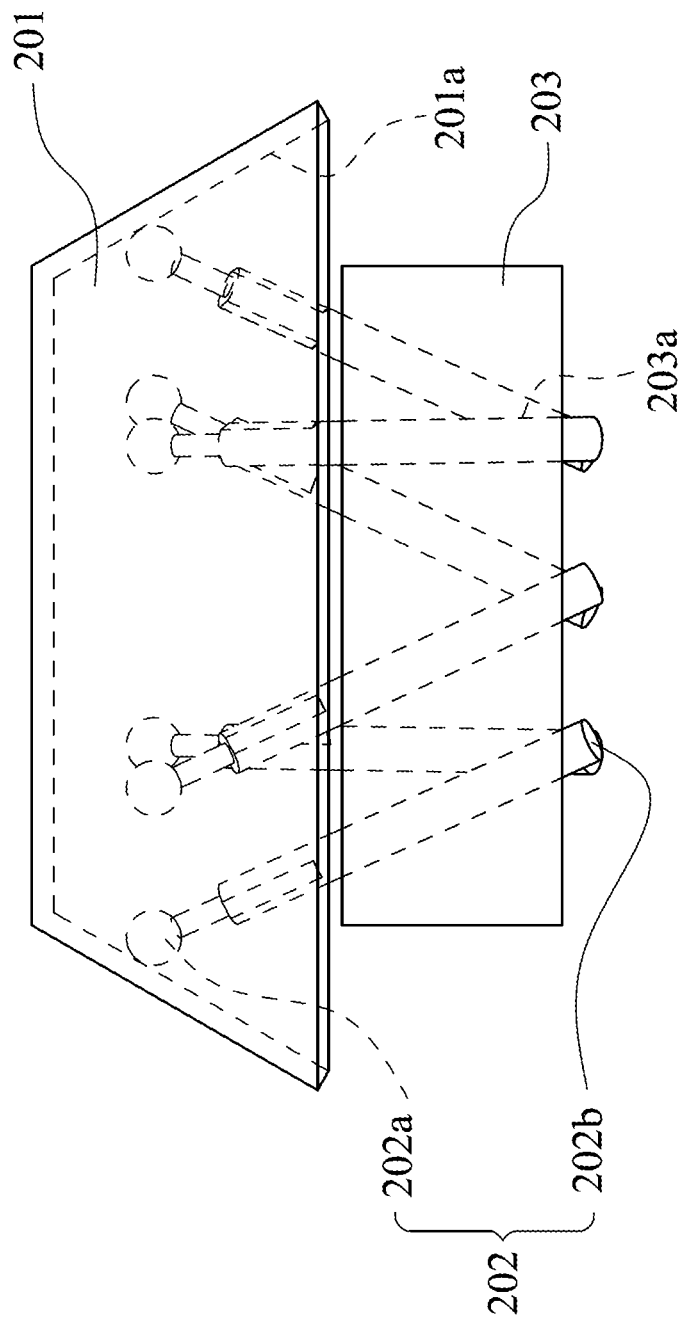
FIG. 8C is a side view showing the electrochemical machining apparatus of FIG. 8A.

In order to describe the electrochemical machining method further specifically, please refer FIG. 8A to FIG. 8C, FIG. 8A is a schematic view showing a structure of an electrochemical machining apparatus which is capable of performing multiple points and multiple angles machining according to one embodiment of the present disclosure; FIG. 8B is another schematic view showing the structure of the electrochemical machining apparatus of FIG. 8A; and FIG. 8C is a side view showing the electrochemical machining apparatus of FIG. 8A.

In FIGS. 8A to 8C, a plurality of guiding apertures 203a are formed in the guiding member 203 of the electrochemical machining apparatus, and a plurality of electrode members 202 are passed through the guiding apertures 203a, respectively. The electrode members 202 can be moved in the guiding apertures 203a, and the moving paths with different angles can be formed by the guiding apertures 203a. Therefore, the conductive ends 202b of the electrode members 202 are guided by the guiding apertures 203a to form different angle variations. The actuation member 201 includes a surrounding sidewall, and an inner surface 201a of the surrounding sidewall can contact with the free ends 202a of the electrode members 202 when the actuation member 201 is moved downward. Therefore, when the actuation member 201 moves downward along a single axis, it can exert a force to the free ends 202a of the electrode members 202, and the conductive ends 202b can be moved to perform machining to the work piece 301. The conductive ends 202b can have various angles respectively and can perform machining simultaneously, thus multiple points and multiple angles machining can be performed to form complicated surface, and the machining efficiency can be increased.

Figure 9A:
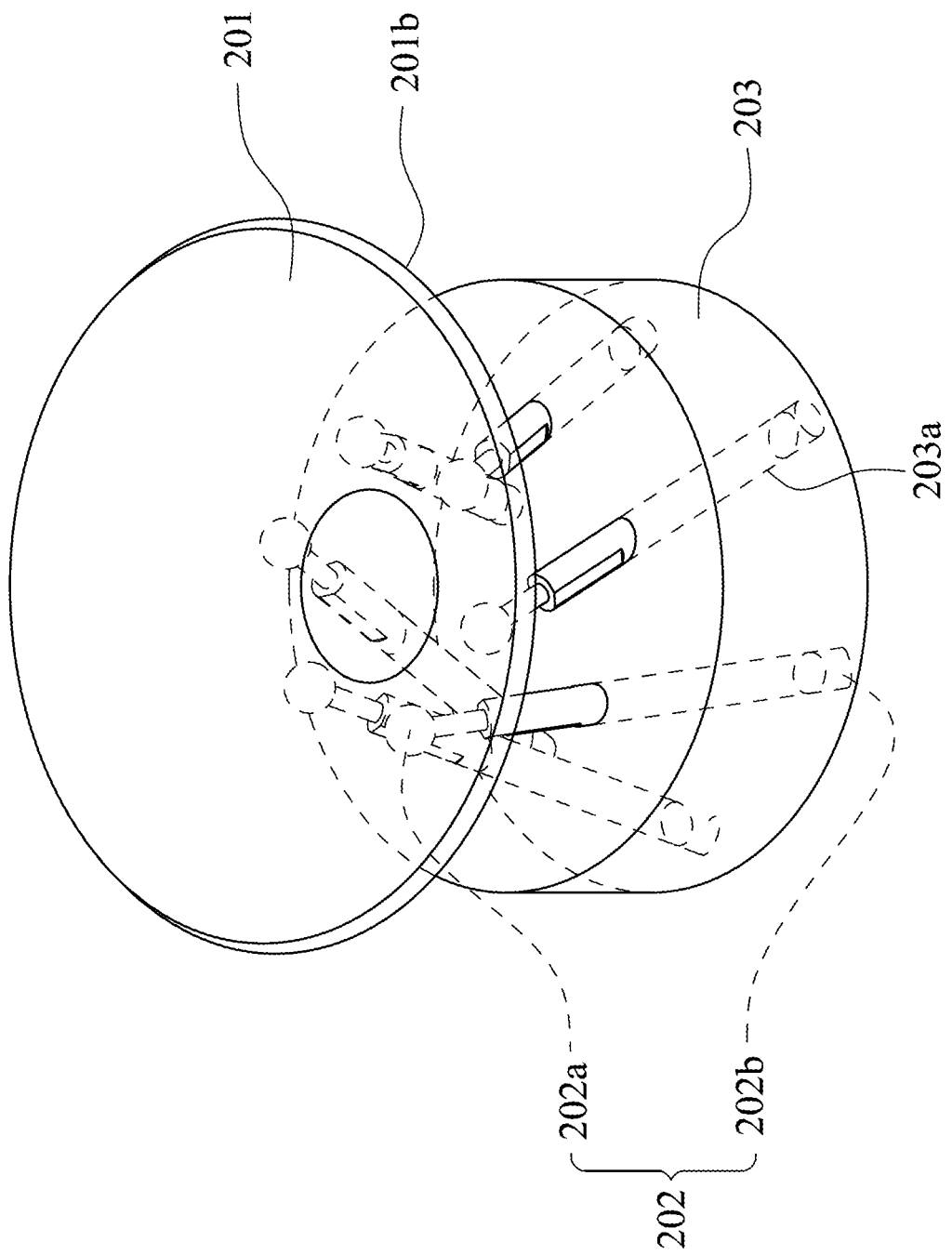
FIG. 9A is a schematic view showing a structure of an electrochemical machining apparatus which is capable of performing multiple points and multiple angles machining according to one embodiment of the present disclosure.
Figure 9B:
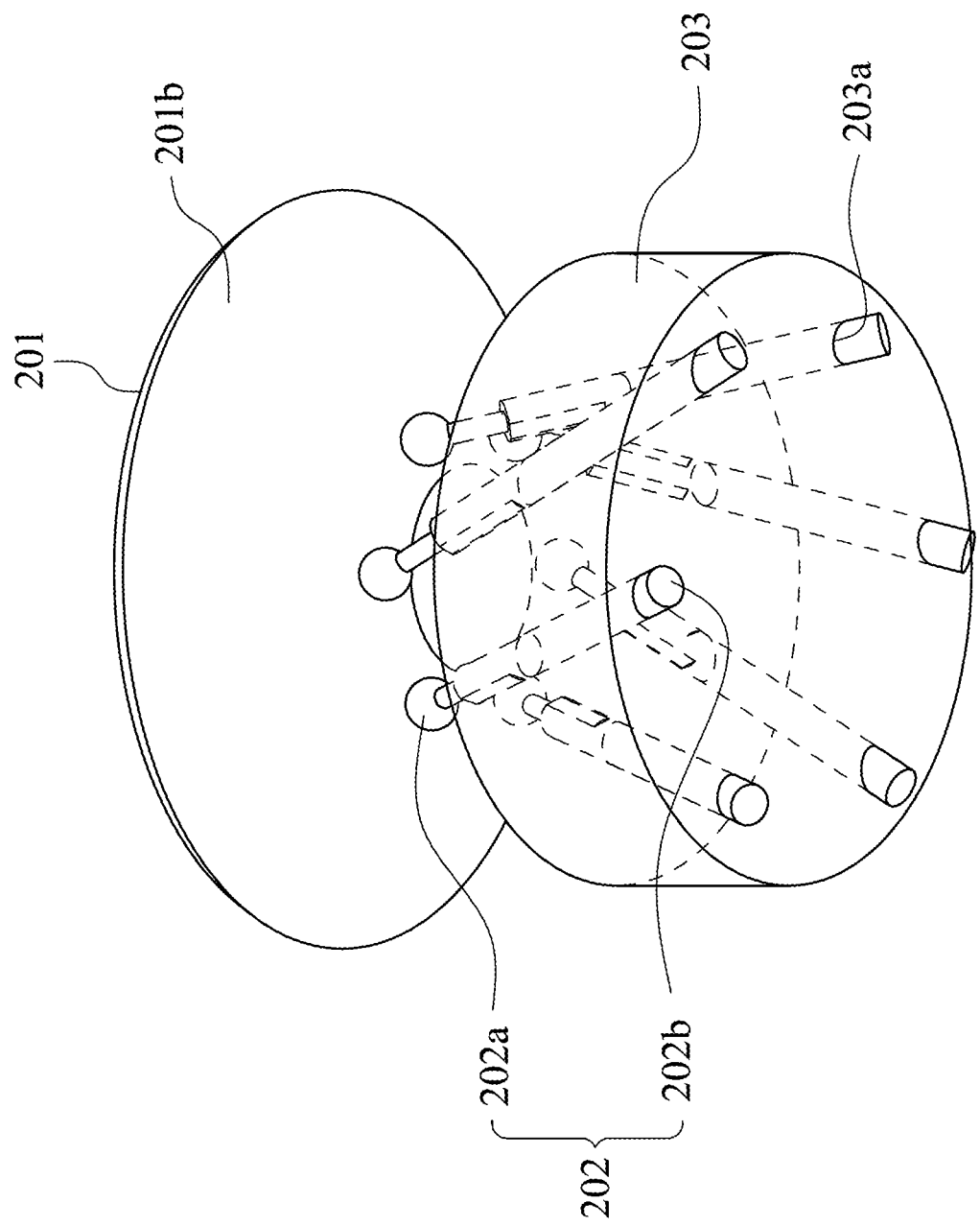
FIG. 9B is another schematic view showing the structure of the electrochemical machining apparatus of FIG. 9A.
Figure 9C:
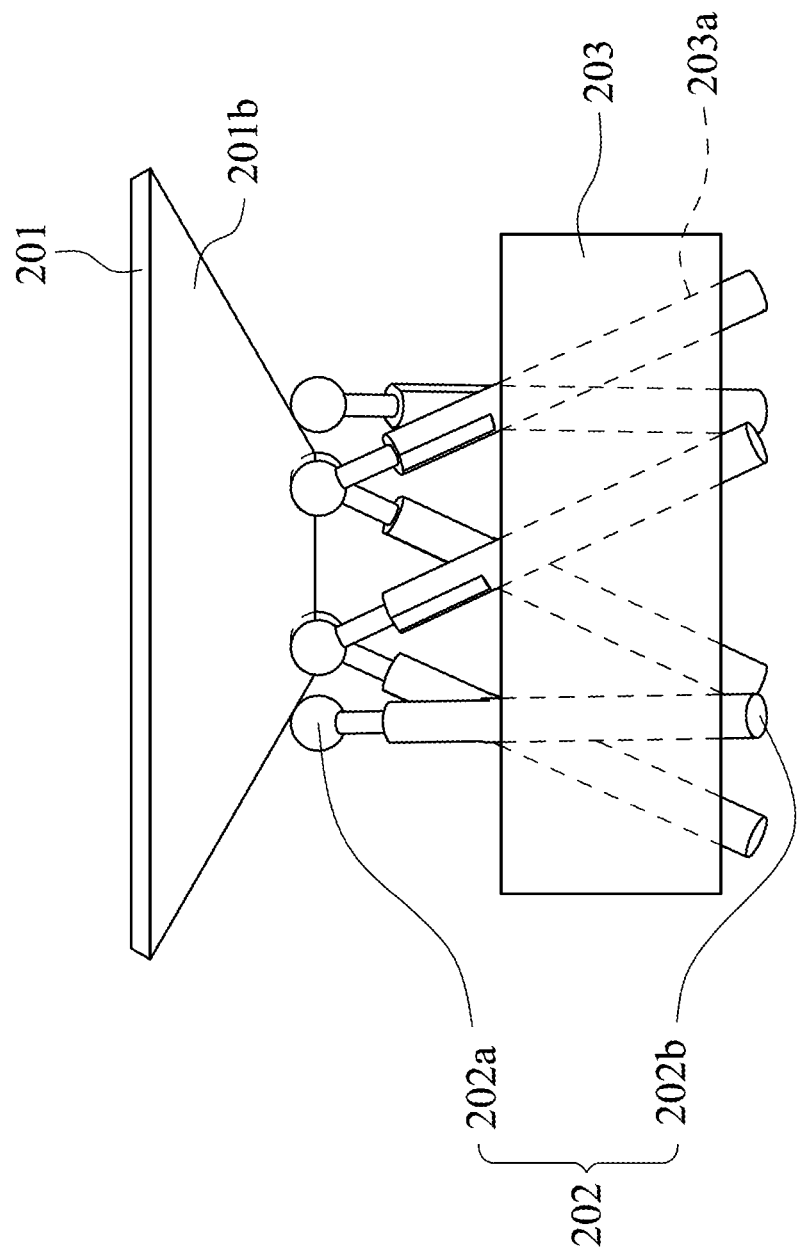
FIG. 9C is a side view showing the electrochemical machining apparatus of FIG. 9A.

Please refer to FIG. 9A to FIG. 9C, FIG. 9A is a schematic view showing a structure of an electrochemical machining apparatus which is capable of performing multiple points and multiple angles machining according to one embodiment of the present disclosure; FIG. 9B is another schematic view showing the structure of the electrochemical machining apparatus of FIG. 9A; and FIG. 9C is a side view showing the electrochemical machining apparatus of FIG. 9A.

In FIGS. 9A to 9C, the structure of the actuation member 201 is different from the structure of the actuation member 201 in FIGS. 8A to 8C. In FIGS. 9A to 9C, the actuation member 201 contacts with the free ends 202a of the electrode members 202 by an outer surface 201b of the surrounding sidewall, therefore, different machining angles can be formed to increase the application range of the electrochemical machining.

In the previous embodiments, the guiding aperture 203a in the guiding member 203 is a straight line. However, according to different demands, the guiding aperture 203a can be an arc shape, and the electrode member 202 can be an arc shape which is corresponding the arc shape of the guiding aperture 203a. Therefore, more complex machining angles can be formed to produce more complex surface of the work piece 301. Furthermore, the electrode member 202 can be rotated during moving, so as to achieve more complex machining.

Figure 10:
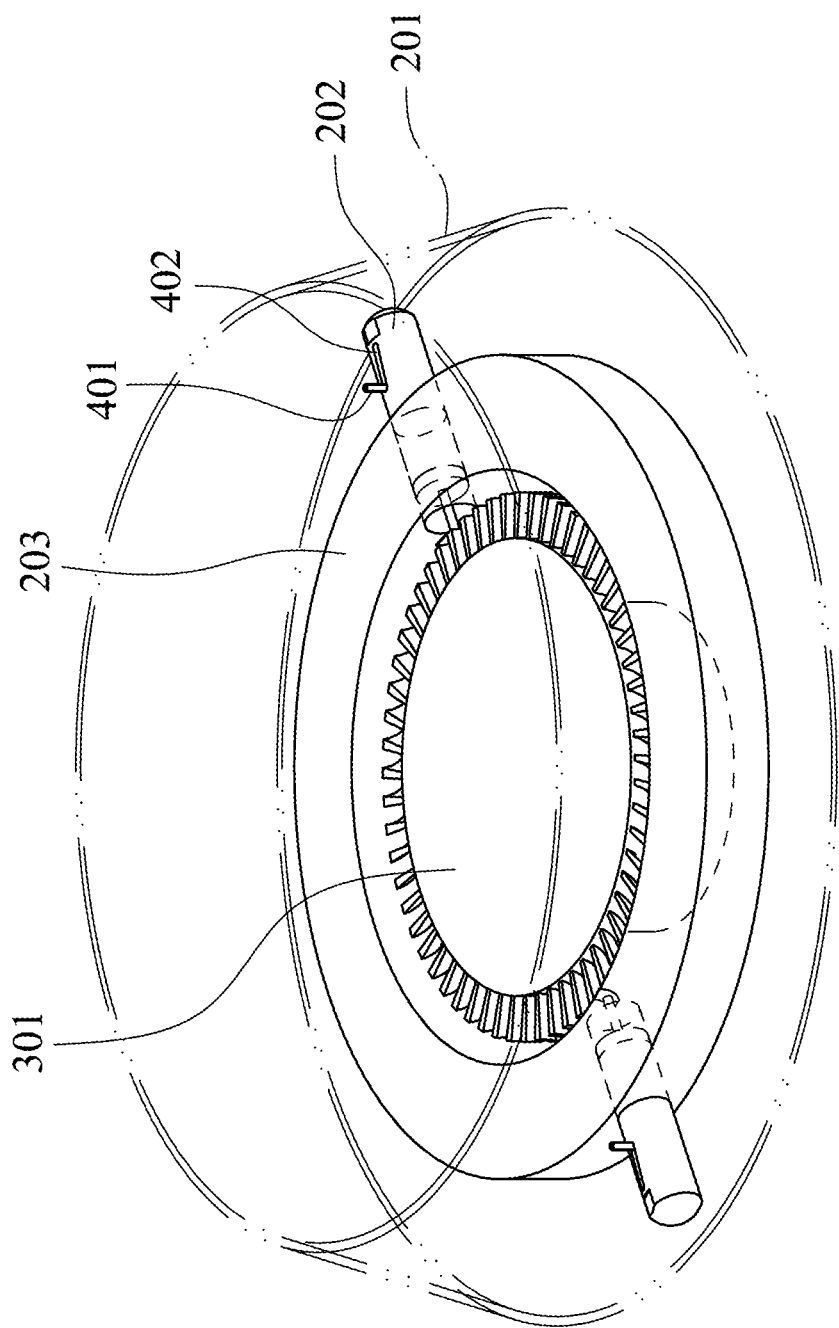
FIG. 10 is a schematic view showing a structure of an electrochemical machining apparatus according to one embodiment of the present disclosure.
Figure 11:
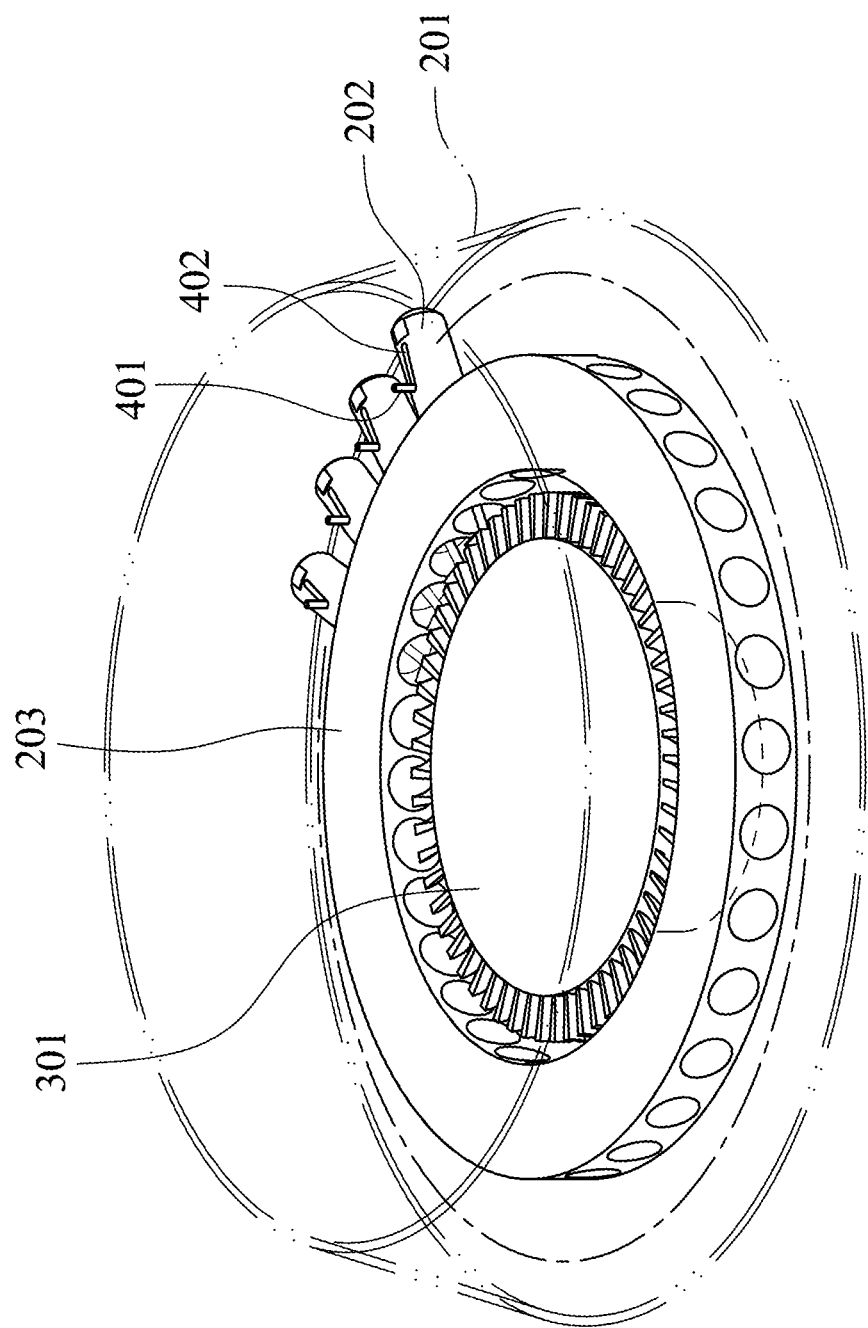
FIG. 11 is a schematic view showing that multiple electrode members which are utilized in the electrochemical machining apparatus of FIG. 10 to perform multiple points with differing orientations machining.
Figure 12:
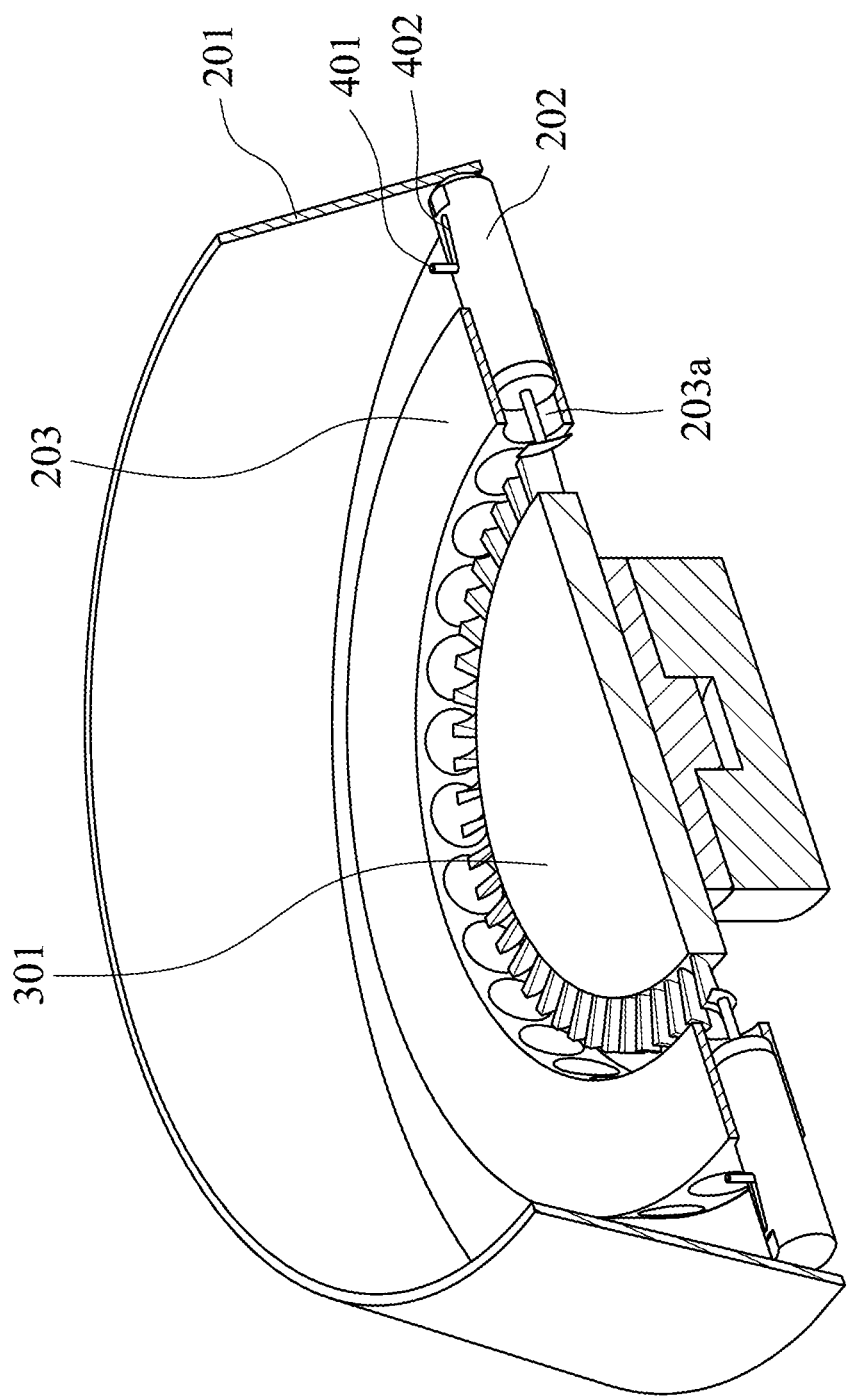
FIG. 12 is a schematic view showing a first state of the electrode member of FIG. 10.
Figure 13:
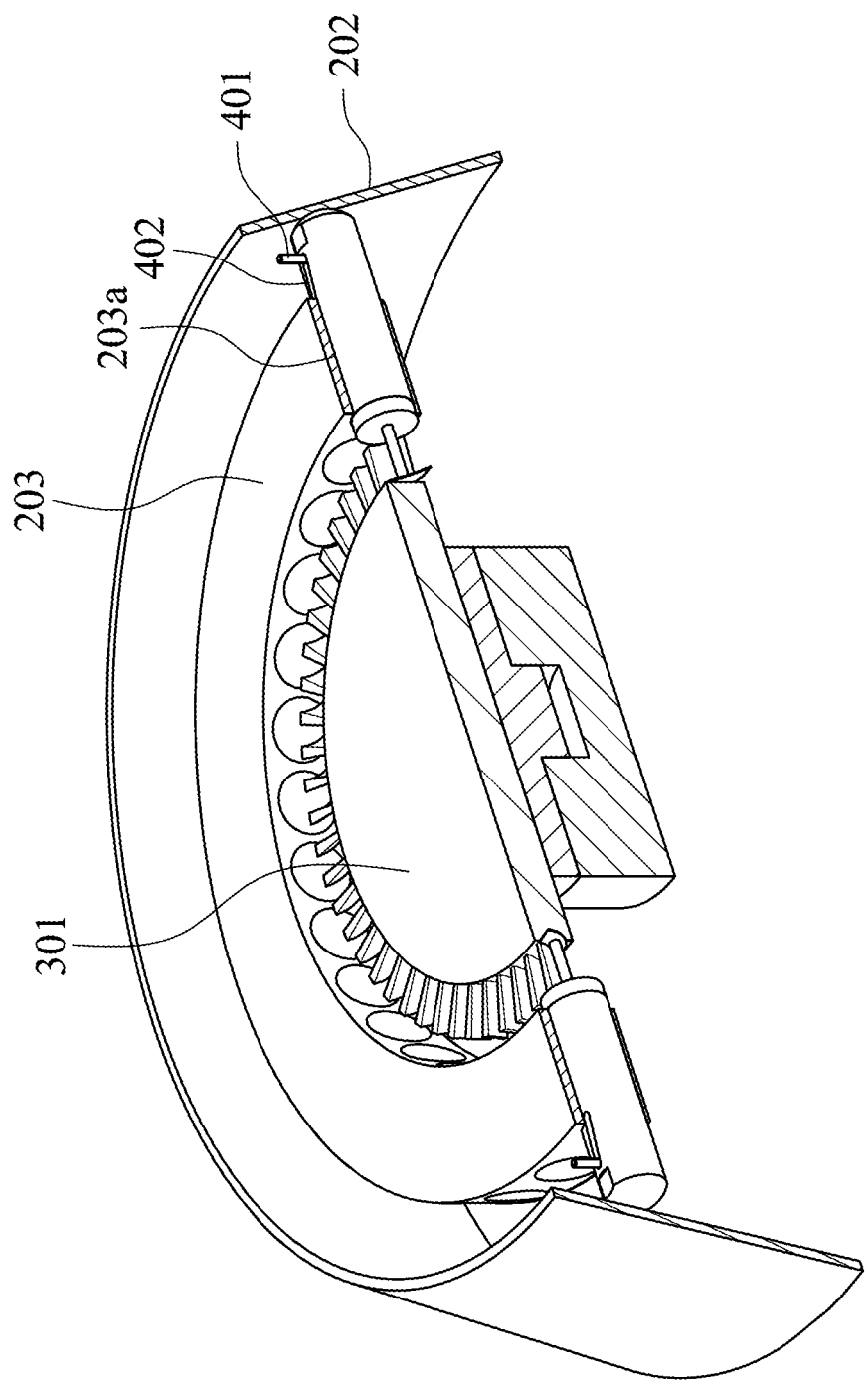
FIG. 13 is a schematic view showing a second state of the electrode member of FIG. 10.
Figure 14:
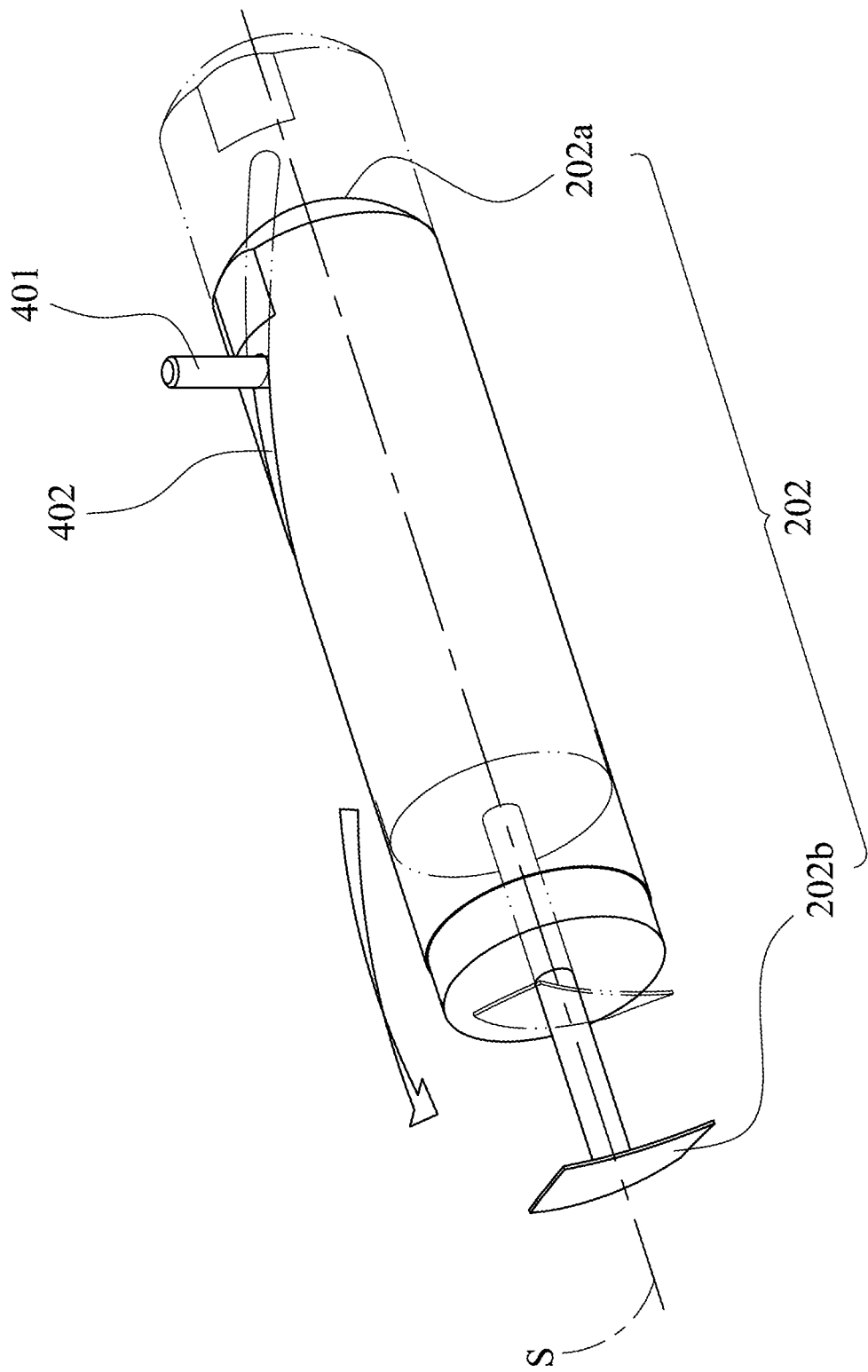
FIG. 14 is a schematic view showing moving and rotating of the electrode member of FIG. 10.

Please refer to FIG. 10 to FIG. 14. FIG. 10 is a schematic view showing a structure of an electrochemical machining apparatus according to one embodiment of the present disclosure; FIG. 11 is a schematic view showing that multiple electrode members 202 which are utilized in the electrochemical machining apparatus of FIG. 10 to perform multiple points with differing orientations machining; FIG. 12 is a schematic view showing a first state of the electrode member 202 of FIG. 10; FIG. 13 is a schematic view showing a second state of the electrode member 202 of FIG. 10; and FIG. 14 is a schematic view showing moving and rotating of the electrode member 202 of FIG. 10.

In FIG. 10, the structure of electrochemical machining apparatus is similar to which in FIG. 9A. The electromechanical machining device in FIG. 10 also has an actuation member 201, a plurality of electrode members 202 and a guiding member 203. It is shown that the electrode members 202 in FIG. 10 are moved along traverse directions, meaning that moving paths of the electrode members 202 can be adjusted in accordance with different situations. For example, in FIG. 9A, the electrode members 202 are moved longitudinally to perform machining; rather than in FIG. 10, the electrode members 202 are pushed by the actuation member 201 and moved transversely to perform machining. In FIG. 10, the conductive end 202b of the electrode member 202 has an arc-shaped. Moreover, the electrode 202 in FIG. 10 is rotatable for performing a more complex machining. To achieve the purpose, a groove 402 is formed on the surface of each electrode member 202. Initially, as shown in FIG. 12, the electrode member 202 is in a first status, and one end of the groove 402 is abutted by a rod 401. The electrode members 202 are continuously pushed by the actuation member 201 to move transversely for continuously performing machining to the work piece 301. Finally, the electrode 202 is in a second state as shown in FIG. 13, the other end of the groove 402 is abutted by the rod 401. Therefore, during the machining process, the rod 401 is fixed, and the groove 402 is deviated from the central axis S from one end to the other end of the electrode member 202. The entire electrode member 202 can be rotated during moving, thereby rotating the conductive end 202b being arc-shaped of the electrode member 202 by the limitation from the rod 401 to the groove 402, so that the complicated machining angles can be achieved. For example, the turbine blades as shown in FIG. 11 with complex curved surfaces can be provided by connecting several aforementioned electrode members 202. In FIG. 14, the electrode member 202 is rotated from the first state to the second state, thus the conductive end 202b of the electrode member 202 is also rotated. The conductive end 202b is arc-shaped, thus complex curved surface can be easily produced.

In sum, the electrochemical machining apparatus 200 is capable of performing multiple points and multiple angles machining by utilizing the free end 202a of the electrode member 202 in combined with angle θ variations between the electrode members 202, thus machining efficiency can be increased, and the machining cost can be reduced.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrochemical machining apparatus, which is capable of performing multiple points and multiple angles machining, the electrochemical machining apparatus comprising:
   at least two electrode members, each of the electrode members comprising a conductive end and a free end, wherein there is a distance between the at least two electrode members, and each of the electrode members is rigid and unbendable;
   a guiding member for limiting and guiding the at least two electrode members to move;
   a pressure box accommodating the guiding member, wherein the pressure box is configured to provide a flow to an electrolyte therein; and
   an actuation member for exerting a force to the free end of each of the electrode members, thereby enabling the conductive end of each of the electrode members to form angle variations, the actuation member comprises a surrounding sidewall, and the force is exerted to free end of each of the electrode members by one of an inner surface and an outer surface of the surrounding sidewall;

wherein a force-exerting direction from the actuation member to each of the free ends is parallel to a central axis of each of the electrode members or deflects off the central axis so as to form the angle variations.

2. The electrochemical machining apparatus of claim 1, wherein the at least two electrode members are aligned in parallel.

3. The electrochemical machining apparatus of claim 1, wherein an angle is formed between two of the at least two electrode members.

4. The electrochemical machining apparatus of claim 3, wherein the angle is from 0 degrees to 180 degrees.

5. The electrochemical machining apparatus of claim 1, wherein a surface of each of the free ends is arc-shaped.

6. The electrochemical machining apparatus of claim 1, wherein each of the conductive ends is arc-shaped.

7. The electrochemical machining apparatus of claim 1, wherein each of the electrode members is rotatable during moving.

8. The electrochemical machining apparatus of claim 1, wherein each of the electrode members has a spring member disposed through by each of the electrode members, and the guiding member comprises a guiding aperture, the spring member is disposed between each of the free ends and the guiding aperture for providing an elastic recovering force to each of the electrode members.

9. The electrochemical machining apparatus of claim 8, wherein the guiding aperture has an arc shape.

10. The electrochemical machining apparatus of claim 9, wherein the conductive end of each of the electrode members has an arc shape, and the arc shape of each of the conductive ends is corresponding to the arc shape of the guiding aperture.

* * * * *